UNITED STATES PATENT OFFICE.

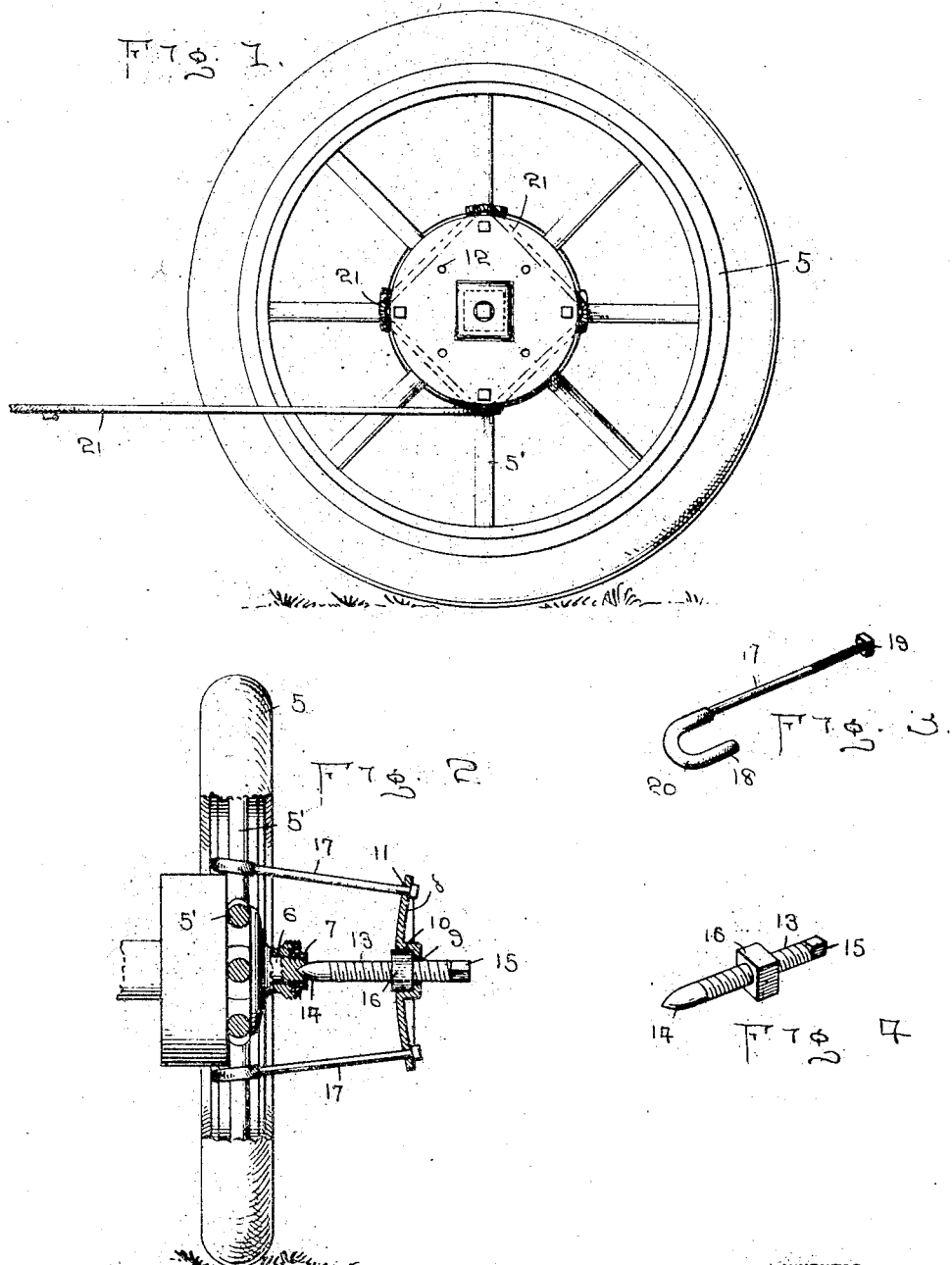

JAMES W. CALTA, OF PLATTE, SOUTH DAKOTA.

AUTOMOBILE APPLIANCE.

1,097,167.  Specification of Letters Patent.  Patented May 19, 1914.

Application filed December 24, 1912. Serial No. 738,482.

*To all whom it may concern:*

Be it known that I, JAMES W. CALTA, a citizen of the United States, residing at Platte, in the county of Charles Mix and State of South Dakota, have invented certain new and useful Improvements in Automobile Appliances; and I do hereby declare the following to be a full, clear, and exact description of the invention, such as will enable others skilled in the art to which it appertains to make and use the same.

This invention relates to automobile appliances, and it more particularly relates to a wheel-removing tool or attachment.

The object of this invention is to provide an attachment of this character which may be quickly and easily applied and operated for removing the rear wheel of an automobile, when desirable to do so, for repairing, etc.

Another object of the invention is to provide an attachment of this character which may be utilized as a capstan, whereunto a rope may be attached, for enabling the automobile to extricate itself from a mudhole or other obstruction.

Another object of the invention is to provide a device of this character which is simple of construction, economical of manufacture and maintenance, strong, durable and thoroughly efficient in operation.

In the accompanying drawing which supplements this specification, Figure 1 is a rear wheel of an automobile having my improved attachment employed as a capstan. Fig. 2 is a fragmental sectional view of the wheel having my improved attachment secured thereon. Fig. 3 is a perspective view of one of the hooks shown in Fig. 3; and Fig. 4 is a perspective view of the screw-threaded elements which constitute a part of my invention.

In these drawings, in which similar reference characters correspond with similar parts throughout the several views, the wheel 5 is mounted upon the shaft or axle 6, in the usual way, the nut 7 being fitted on the end of the axle 6 for preventing the movement of the wheel in its axial direction on the axle. It is well known that the rear wheels of an automobile are usually secured on the axle in fixed relation thereto, and therefore, considerable force is required to remove the wheel from the axle.

By means of my improved wheel-removing tool, I am enabled to apply the necessary force in the proper way for quickly and easily removing the wheel, as follows: First, I provide a disk 8, which is preferably concavo-convexed, and which is centrally apertured at 9, and provided with a non-circular recess 10 around the central aperture. A disk is also provided with the series of concentrically disposed apertures 11 which are arranged on a common circle which is concentric of the disk. The disk may be provided with a second series of apertures 12. Within the central aperture is located a screw 13 having a conical point 14 and a square head 15. A nut 16 is fitted on the screw 15 and seated non-rotatably in the recess 10. The stay rods 17 are formed with a hook 18 on one end and a head 19 on its other end. The hooks 18 are covered with rubber 20 or other suitable material, for protecting the spokes 5', which are engaged thereby, as shown in Fig. 2.

In attaching the device, the screw and nut shown in Fig. 4 are first in proper relation with the disk, as shown in Fig. 2, the nut 16 having previously been turned on the screw so as to move it in the direction of the point 14. The hooks 18 are engaged with the spokes 5, and the screw 13 is then turned until its point has entered the countersink in the end of the axle 6. The nut 7 is now unscrewed and removed from the axle 6, whereupon it may be supported by the screw 13. Said screw is next turned, by means of a wrench or other proper tool (not shown), until the wheel 5 and axle 6 have been drawn outward and moved inward, respectively, a sufficient distance to move the wheel from the axle; it being understood, of course, that the wheel and axle should be properly supported during this operation.

On account of the disk 8 being concavo-convexed, the maximum strength thereof is obtained consistent with simplicity and economy.

When it is desired to employ this attachment as a capstan, the nut 7 is allowed to remain on the axle 6, so that when the screw 13 is tightened the entire attachment becomes rigid with the wheel and axle. Now it will be seen that if the rear wheels become so embedded in the mud that the automobile is unable to extricate itself in the usual way, a rope or cable 21 may have one end secured to the wheel or to one of the rods 17, and have its adjacent portion coiled around the group of rods, as shown in Fig.

1. The other end of the flexible member 21 is then secured to some substantial fixed object, and the engine of the automobile is started, whereupon, the rear wheels will slip in the mud, and in doing so, will wind the flexible element 21 upon the rods 17, which now form a capstan, around the wheel hub.

It will be seen that I have provided a device of this character which is fully capable of attaining the foregoing object, in a thoroughly practical and efficient manner.

I do not limit my invention to the exact details of construction, combination and arrangement of the parts, as herewith illustrated and described; but my invention may only be limited by a reasonable interpretation of the claims.

I claim:

1. A device of the character described comprising a disk, said disk provided with a central aperture, series of concentric apertures therein, stay rods removably secured in a certain series of said apertures and having hooks adapted to engage the spokes of a wheel, a screw threaded member passing through said central aperture, a nut threaded on said screw threaded member from one end thereof, a housing surrounding said central aperture for the reception of said nut, said end of the screw threaded member being adapted to rest against the wheel axle, and said screw threaded member adapted to move through said nut.

2. A device of the class described comprising a concavo-convex disk, stay rods secured at one end to said disk and provided with hooks adapted to engage the spokes of a wheel, and a screw threaded member extending through said disk and adapted to engage a wheel axle, said screw threaded member adapted to move through said disk for removing said wheel from the axle.

3. A device of the character described comprising a disk having an inner and outer concentric series of apertures therein, stay rods removable in a certain series of said apertures, said stay rods having substantially straight shanks and having the free ends thereof formed with hooks adapted to engage the spokes of a wheel, a screw threaded member extending through said disk and adapted to engage the wheel axle, and said threaded member being adapted to exert tension between said wheel and said disk.

In testimony whereof I have signed my name to this specification in the presence of two subscribing witnesses.

JAMES W. CALTA.

Witnesses:
Wm. F. McCall,
George W. Calta.